Aug. 14, 1962 B. E. HOOPER 3,049,586

SIGNALING SYSTEM

Filed March 31, 1959 2 Sheets-Sheet 1

| Oscillator 10 | Oscillator 16 | Beat Frequency |
|---|---|---|
| 40.25 | 41.5 | 1.25 |
| 40.25 | 38.25 | 2.0 |
| 40.25 | 37.5 | 2.75 |
| 41.0 | 37.5 | 3.5 |

INVENTOR:
Brian E. Hooper

By Smyth & Roston

Attorneys

Aug. 14, 1962 B. E. HOOPER 3,049,586

SIGNALING SYSTEM

Filed March 31, 1959 2 Sheets-Sheet 2

INVENTOR:
Brian E. Hooper

By Smyth & Roston

Attorneys.

3,049,586

SIGNALING SYSTEM

Brian E. Hooper, Sherman Oaks, Calif., assignor to Packard-Bell Electronics Corporation, Los Angeles, Calif., a corporation of California Filed Mar. 31, 1959, Ser. No. 803,215
13 Claims. (Cl. 178—5.8)

This invention relates to television receivers and, more particularly, to apparatus for providing a remote control over the operation of television receivers.

In the past few years, television receivers have become a standard item in the American home. The receivers generally have a plurality of controls which are located at the front of the receiver. These controls are manually operated to adjust the characteristics of the picture being seen at any instant and the characteristics of the sound being heard at that instant. For example, one control may be designated as the channel selector and is used to vary the channel being viewed at any instant. The channel selector includes a shaft which is rotated in either one of two opposite directions to change the channel being viewed.

The manual controls on the front of the television receiver also include a knob which is initially rotated manually in a first direction to turn on the television receiver. Subsequent rotation of the knob in the first direction produces corresponding increases in the intensity of the sound emanating from the receiver. Rotation of the knob in the opposite direction produces corresponding decreases in the intensity of the sound being heard from the receiver. Continued rotation of the knob in the second direction causes the television receiver to be turned off.

Various attempts have been made to control the operation of the television receiver on a remote basis. This is desirable in order to allow the viewer to change stations or to adjust the intensity of the sound without having to get up from a comfortable chair, approach the receiver, adjust the receiver and then return to the chair. The remote control apparatus now in use has only partially accomplished this purpose since it has not allowed the viewer to produce gradual and infinitely variable changes in the intensity of the sound.

This invention provides remote control apparatus which is operative to provide a control over the operation of a television receiver from a position removed from the receiver. The apparatus constituting this invention includes controls for obtaining changes in the channel being viewed at the receiver at any instant. The apparatus constituting this invention also includes features for turning the television set on or off and for adjusting the intensity of the sound to any desired level. The apparatus is especially advantageous since the same controls are used to turn the television receiver on or off and to adjust the intensity of the sound in the receiver.

The apparatus constituting this invention produces first, second, third and fourth distinctive signals which are transmitted from a remote position in accordance with the actuation of different control members and which are received by special equipment at the receiver. The first, second, third and fourth distinctive signals may be produced by beating a pair of signals having particular frequencies. The first and second distinctive signals respectively cause the channel selector to be rotated in the forward direction or in the reverse direction so that different stations can be selected. The third signal initially causes the television receiver to be turned on and then causes the intensity of the sound in the receiver to be gradually increased. The fourth signal causes the intensity of the sound in the receiver to be gradually decreased and then causes the television receiver to be turned off.

The apparatus controlled at the receiver by the third and fourth signals includes first and second relay means. The first relay means is energized by the third signals from the remote position so as to obtain the operation of a motor. The motor in turn rotates the knob in a direction to turn the set on and to progressively increase the intensity of the sound from the receiver. Both the third and fourth relay means become energized by the fourth signal to obtain an operation of the motor in an opposite direction. The motor in turn rotates the knob in a direction to reduce the intensity of the sound from the television receiver and subsequently to turn off the receiver. Means are associated with the third relay means to prevent the station from being changed on a remote basis during the time that the third or fourth signals are being received at the television receiver.

Figure 1:
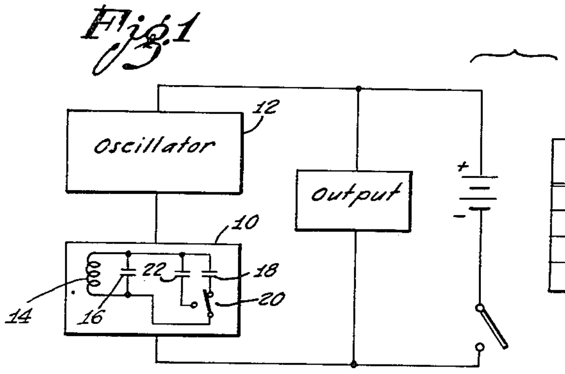
FIGURE 1 is a circuit diagram, partly in block form, somewhat schematically illustrating apparatus removed from the receiver for producing first, second, third and fourth signals to provide different controls over the operation of a television receiver and also includes a chart illustrating how the first, second, third and fourth signals are produced on a beat frequency basis.

The apparatus constituting this invention includes a transmitter which may be separated from a television receiver and which is easily portable to any position in a viewing area such as a room. For example, the apparatus shown in FIGURE 1 may be easily held within the palm of a viewer's hand. The apparatus shown in FIGURE 1 includes a pair of oscillators 10 and 12, each of which may be constructed in a conventional manner.

Each of the oscillators 10 and 12 may be constructed to provide different frequencies depending upon the controls exerted upon the oscillator. For example, the oscillator 10 may include a tuned circuit formed by a coil 14 and a capacitance 16 in parallel. A capacitance 18 may be connected in parallel with the capacitance 14 upon the positioning of the movable arm of a single-pole, double-throw switch 20 in a first position. A capacitance 22 may be substituted across the capacitance 16 in place of the capacitance 18 when the movable arm of the single-pole, double-throw switch is moved into engagement with the second stationary contact.

The capacitances 18 and 22 may be provided with different values to vary the frequency of the signals produced by the oscillator 10. By way of illustration, the oscillator 10 may be constructed to produce signals at a frequency of 41.0 kilocycles per second when the capacitance 18 is in the circuit. With the capacitance 22 in the circuit in place of the capacitance 18, the oscillator 10 may be adapted to produce signals at a frequency of 40.25 kilocycles per second.

In like manner, the oscillator 12 may be constructed to produce signals at three different frequencies such as 37.5, 38.25 and 41.5 kilocycles per second. The switches associated with the oscillators 10 and 12 are so interrelated in operation that only particular combinations of signals can be produced by the oscillators. These combinations of signals are illustrated in FIGURE 1 and are chosen to obtain beat signals having a distinctive frequency for each combination of signals from the oscillators 10 and 12.

The signals produced by the oscillators 10 and 12 are introduced to an output stage such as an amplifier for transmission throughout the viewing area such as the room. Since the signals from the oscillators 10 and 12 are mixed, signals having beat frequencies are produced. The beat frequency is used to control the operation of the television receiver. As will be seen from FIGURE 1, signals having four different beat frequencies may be produced dependent upon the frequency of the signals from the oscillators 10 and 12.

By way of illustration, the beat signals may have frequencies of 1.25, 2.0, 2.75 and 3.5 kilocycles. The beat signals having frequencies of 2.75 and 3.5 kilocycles may be respectively used to provide different controls over the operation of the receiver such as to change the channel being selected in a forward direction and to change the channel being selected in a reverse direction. The beat signals having a frequency of 2.0 kilocycles may be used initially to turn on the television receiver and subsequently to progressively increase the intensity of the sound from the receiver. The beat signals having a frequency of 1.25 kilocycles may be used to progressively decrease the intensity of the sound from the receiver and eventually to turn off the receiver.

Stages are included at the receiver for amplifying and detecting the signals transmitted by the apparatus shown in FIGURE 1. The stages at the receiver include those shown in block form in FIGURE 2. These stages include an antenna 30 which introduces the signals from the transmitter shown in FIGURE 1 to amplifier stages 32, 34 and 36 connected in cascade relationship. The signals produced by the amplifier 36 are introduced to a detector stage 38 which is constructed so that only the signals having the beat frequencies are able to pass through the detector. These beat frequency signals are then amplified by stages 40, 42 and 44 connected in cascade relationship.

The output signals from the amplifier 44 are introduced to a limiter circuit 46 which regulates the amplitude of the signals within particular limits. The output from the limiter 46 then passes to tuned circuits 48, 50, 52 and 54. Each of the tuned circuits 48, 50, 52 and 54 is constructed to pass signals at a different one of the beat frequencies. For example, the tuned circuits 48, 50, 52 and 54 may be respectively constructed to pass signals at beat frequencies at 1.25, 2.0, 2.75 and 3.5 kilocycles per second.

The signals from the tuned circuits 48, 50, 52 and 54 are respectively introduced to stages 56, 58, 60 and 62 which include a current-control member such as a vacuum tube and also include a relay. The tubes in the stages 56, 58, 60 and 62 become conductive upon the introduction of signals from the associated tuned circuits 48, 50, 52 and 54 and convert the alternating signals at the beat frequencies into a direct voltage for energizing the associated relays. The construction and operation of stages corresponding to the stages shown in FIGURE 2 described above are fully set forth in co-pending application Serial No. 766,436, filed October 10, 1958 by me.

Figure 2:
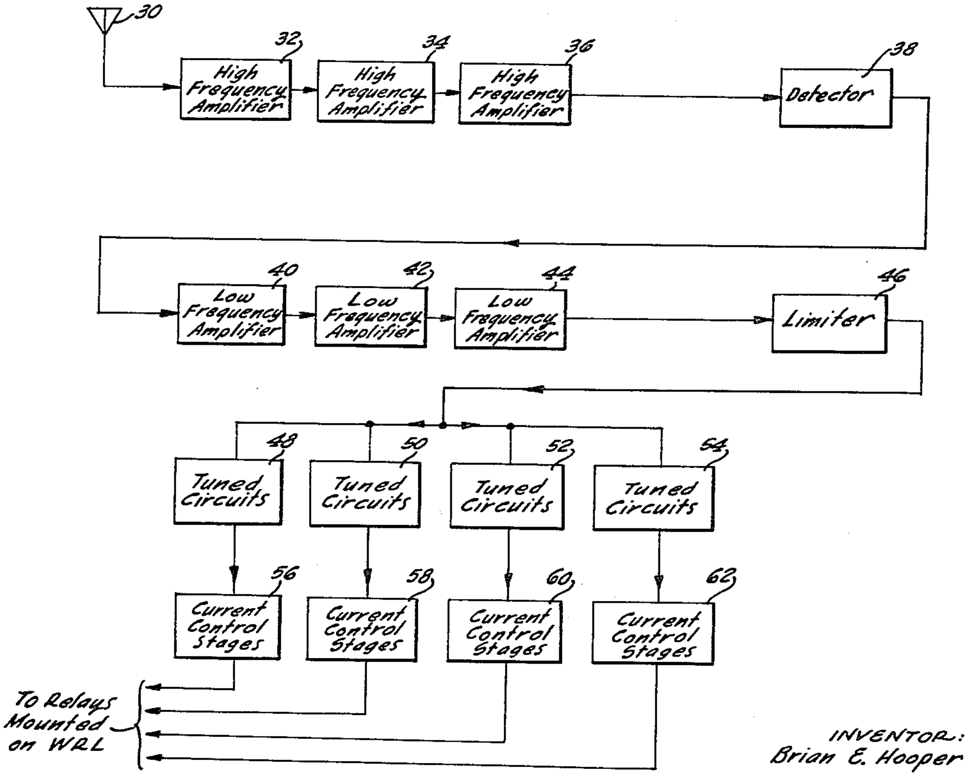
FIGURE 2 is a circuit diagram in block form and somewhat schematically illustrates stages at the television receiver for detecting and channelizing the first, second, third and fourth signals.
Figures 3, 4, 5:
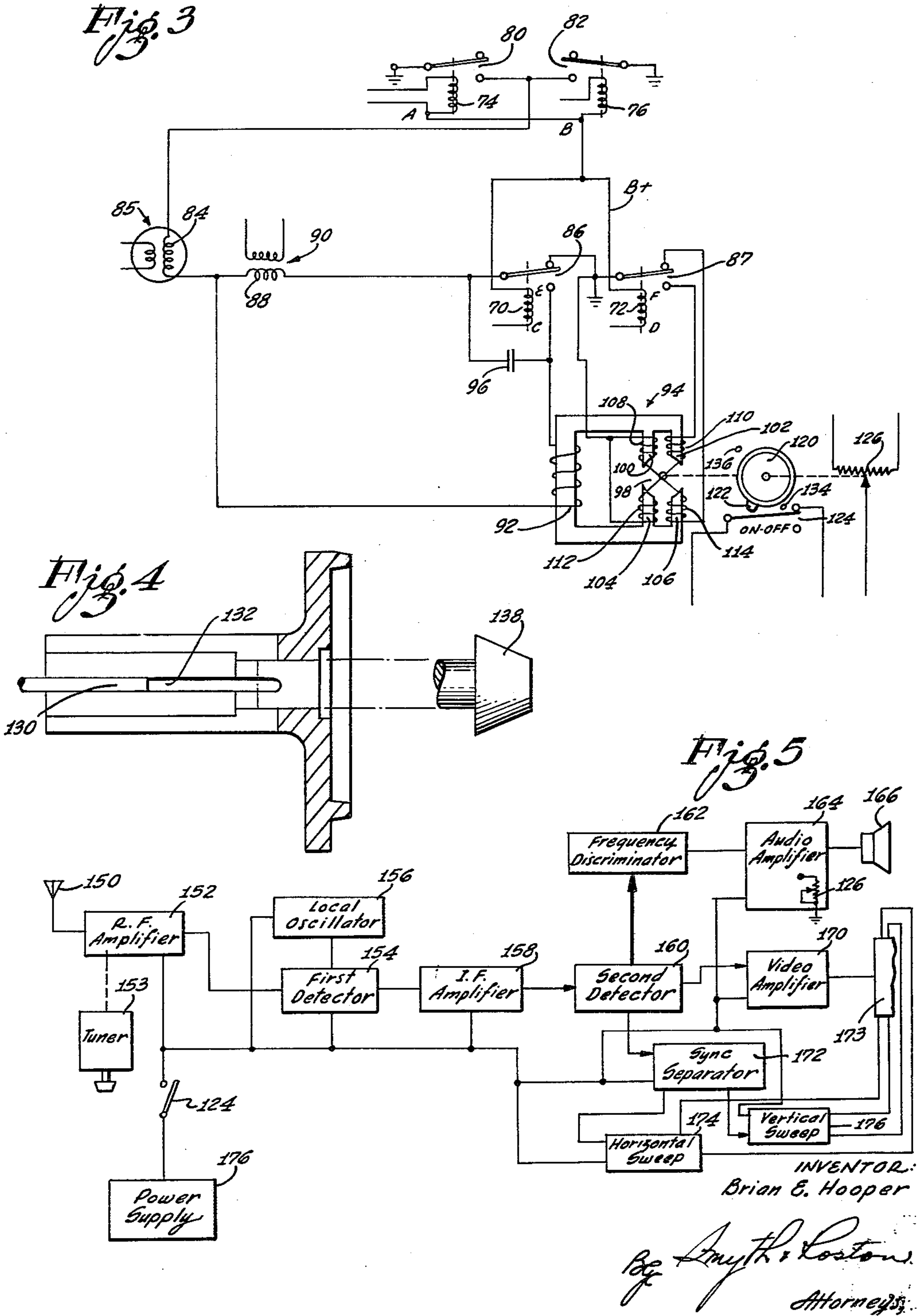
FIGURE 3 is a circuit diagram somewhat schematically illustrating apparatus at the television receiver for using the first, second, third and fourth signals to provide selected controls over the operation of the television receiver.
FIGURE 4 is a sectional view of certain components in a television receiver for controlling the energizing of the receiver and the intensity of the sound from the receiver.
FIGURE 5 is a circuit diagram somewhat schematically illustrating in block form the construction of a television receiver.

The relays controlled by the stages 56, 58, 60 and 62 in FIGURE 2 are illustrated at 70, 72, 74 and 76 in FIGURE 3. The relays 74 and 76 are included in FIGURE 3 to respectively change in forward and reverse directions the channel being selected for viewing at any instant. For example, when the relay 74 is energized, it causes the channel selector to be rotated in the forward direction such as from channel 2 to channel 3. Similarly, the relay 76 is instrumental upon becoming energized in causing the channel being selected to change by way of illustration from channel 4 to channel 3. Apparatus controlled by the energizing of the relays 74 and 76 to obtain actuation of the channel selector is shown and described in full detail in co-pending application Serial No. 766,436, filed October 10, 1958, by me.

The apparatus controlled by the relays 74 and 76 includes switches 80 and 82, the movable arms of which are grounded. The switches 80 and 82 are of the single-pole, double-throw type and are magnetically coupled to the relays 74 and 76 respectively so as to become actuated when their associated relays become energized. No connections are made to first stationary contacts of each of the switches 80 and 82. The second stationary contacts of the switches 80 and 82 are connected to one terminal of a winding 84 in a motor generally indicated at 85, the motor being coupled to the channel selector to drive the selector. When energized, the winding 84 in the motor 85 causes the motor to become operative so as to drive the channel selector.

The apparatus shown in FIGURE 3 also includes single-pole, double-throw switches 86 and 87, the movable arms of which are respectively disposed in magnetic proximity to the relays 70 and 72 so as to become actuated upon an energizing of the associated relays. The movable arm of the switch 87 and the upper stationary contact of the switch 86 in FIGURE 4 are grounded. The movable arm of the switch 86 is connected to one terminal of a winding 88 in a transformer generally indicated at 90. The second terminal of the winding 88 is connected to the second terminal of the winding 84 in the channel-selector motor 85 and to one terminal of the winding 92 in a motor generally indicated at 94. The second terminal of the winding 92 is connected to the lower stationary contact of the switch 86 in FIGURE 3 and is coupled through a capacitance 96 to the movable arm of the switch 86 in that figure.

The motor 94 may be a type 58082 obtained from the Electro Counter Motor Manufacturing Company of Chicago, Illinois. In addition to the winding 92, the motor 95 includes a rotor 98 which is magnetically coupled to a plurality of spaced poles 100, 102, 104 and 106. Windings 108, 110, 112 and 114 are respectively disposed on the pole pieces 100, 102, 104 and 106. The windings 108 and 114 are connected in a series relationship between the movable arm and the upper stationary contact of the switch 87 in FIGURE 3. Similarly, the windings 110 and 112 are connected in series between the lower stationary contact of the switch 87 and the movable arm of the switch in FIGURE 3.

The rotor 98 of the motor 94 is mechanically coupled when the stator coil is energized to a cam 120 having a lobe 122. The cam 120 is rotatable into a position where the lobe 122 actuates the movable arm of a single-pole, double-throw switch 124 from the upper stationary contact to the lower stationary contact in FIGURE 3. The switch 124 is connected in the television receiver to serve as the master switch of the receiver. This may be accomplished by connecting leads to the movable arm and the upper stationary contact of the switch and by making no connections to the lower stationary contact of the switch in FIGURE 3.

The rotor 98 of the motor 94 is also mechanically coupled to the movable arm of a potentiometer 126 so as to vary the position of the movable arm. The intensity of sound is dependent upon the positioning of the movable arm of the potentiometer 126. The mechanical coupling between the rotor 98 of the motor 94, the cam 120 and the potentiometer 126 may be obtained in a mechanical arrangement similar to that shown in FIGURE 4. This mechanical arrangement includes a shaft 130 which extends from the rotor 98 into a socket 132 formed in the cam 120. The shaft 130 frictionally engages the cam 120 so as to drive the cam until the rotational movement of the cam becomes interrupted by stops 134 and 136 in FIGURE 3. Thereafter, the shaft 130 rotates without driving the cam 120. Rotation of the cam 120 and of the movable arm of the potentiometer 126 can also be effectuated by rotating a knob 138 which is connected to the cam 120 at the front end of the television receiver.

Upon the occurrence of a particular beat frequency such as 2.75 kilocycles per second, the relay coil 74 becomes energized so as to actuate the movable arm of the switch 80 into engagement with the lower stationary contact of the switch in FIGURE 3. This causes a continuous circuit to be established which includes the switch, the winding 84 of the motor 85 and the winding 88 of the transformer 90. Upon the establishment of this continuous circuit, the motor 85 becomes operative to drive the channel selector in a forward direction. In like manner, the motor 85 becomes operative to drive the channel selector in a reverse direction when the relay coil 76 becomes energized by a beat frequency of 3.5 kilocycles per second to actuate the switch 82. The circuitry controlling the operation of the motor 85 in opposite directions is not included in FIGURE 3.

When signals are transmitted by the oscillators 10 and 12 in FIGURE 1 so that signals having a beat frequency of 2.0 kilocycles are produced, the relay 70 becomes energized in a manner similar to that described above. This causes the movable arm of the switch 86 to become actuated into engagement with the lower stationary contact of the switch in FIGURE 3, thereby interrupting the ground potential on the movable arm of the switch. This causes any continuous circuit through the channel-selector motor 85 and the winding 88 of the transformer 90 to become opened so that the motor cannot become operative to change the channel being viewed.

Preventing the motor 85 from becoming operative as set forth in the previous paragraph is desirable since the intensity of the sound between adjacent channels may be different. This results from the fact that no complete control can be instantaneously obtained over the intensity of the sound if the channel is being changed at the same time that the intensity of the sound is being adjusted. At the least, control over the intensity of the sound would be made difficult so that the desired intensity of sound would require an increased length of time to be obtained.

Engagement between the movable arm of the switch 86 and the lower stationary contact of the switch in FIGURE 3 causes a continuous circuit to be established which includes the switch, the winding 92 of the motor 94 and the winding 88 of the transformer 90. When the winding 92 becomes energized, it causes flux to be produced in the pole pieces 100, 102, 104 and 106. This flux causes voltages to be induced in the windings 108 and 114 such that current flows through a circuit including these windings and including the upper stationary contact and movable arm of the switch 87. The resultant production of flux by the flow of current through the windings 108 and 114 causes the rotor 98 of the motor 94 to move angularly in a first direction.

Initially, the lobe 122 on the cam 120 may be disposed against the stop 134 so that the lobe positions the movable arm of the switch 124 against the lower stationary contact of the switch. This causes the switch 124 to be opened so that the television receiver cannot be energized. The movable arm of the potentiometer 126 is mechanically coupled to the rotor 98 and the cam 120 so that no potential is obtained from the movable arm of the potentiometer when the lobe 122 of the cam 120 is disposed against the stop 134.

When the rotor 98 starts to rotate in the first direction, the lobe 122 moves initially away from the movable arm of the switch 124 so that the switch becomes closed. This causes the television receiver to become energized. Continuous rotation of the rotor 98 in the first direction causes the movable arm of the potentiometer 126 to move along the wound turns of wire in the potentiometer so that an increased potential is produced on the movable arm of the potentiometer. Because of this, sound of a progressively increasing intensity is obtained from the movable arm of the potentiometer. In this way, beat signals having a frequency of 2.0 kilocycles are produced until the desired intensity of sound is obtained from the television receiver.

It may sometimes be desired to decrease the intensity of sound in the receiver or even to turn off the television receiver. This is obtained by producing signals having a suitable beat frequency such as a frequency of 1.25 kilocycles. This frequency causes both of the relays 70 and 72 to become energized. When the relay 70 is energized, it prevents the channel-selector motor 85 from being energized in a manner similar to that described above so that the channel being viewed at any instant cannot be varied on a remote basis. At the same time, the movable arm of the switch 87 is actuated by the relay 72 into engagement with the lower stationary contact of the switch in FIGURE 3.

Actuation of the movable arm of the switch 87 causes a continuous circuit to be established through the windings 110 and 112 so that the rotor 98 moves angularly in a second direction opposite to that described previously. Because of this, the intensity of the sound from the television receiver decreases. When the intensity has decreased to a value of "0," the lobe 122 of the cam 120 moves into engagement with the movable arm of the switch 124 so that the television receiver is turned off. The switch 124 is maintained in the "off" position because the rotation of the cam 120 is limited by the stop 134.

It may sometimes be desired to retain the picture after the sound has been reduced to a negligible value. This is accomplished by constructing the cam 120 and the potentiometer 126 so that the cam has to travel through an additional distance after the sound has been reduced to zero and before the switch 124 can become opened by the lobe 122 on the cam. By providing this additional distance on the cam 120 and on the potentiometer 126, the positioning of the cam and the movable arm of the potentiometer can be conveniently controlled so that the movements of these members become interrupted after the sound has been reduced to zero and before the switch 124 has become opened. In this way, the members can be controlled so that the picture can be seen from the television receiver without the accompanying sound being heard.

A somewhat schematic block diagram of a television receiver is shown in FIGURE 5. The receiver includes an antenna 150 and a radio frequency (R.F.) amplifier 152 connected to the antenna to receive the signals from the antenna. The frequency of the signals passed by the R.F. stage 152 is dependent upon the particular channel being selected at any instant, whether by the remote control apparatus described above and constituting this invention or by the manually operated knobs located at the television receiver and including the knob 138. The tuner controlling the frequency of the signals passed through the amplifier 152 is illustrated at 153 in FIGURE 5.

A detector 154 receives signals from the amplifier 152 and from a local oscillator 156 and beats the signals from the amplifier with the signals of reduced frequency from the oscillator to produce signals at an intermediate frequency. The signals from the detector 156 are introduced to an intermediate frequency amplifier 158 for obtaining an amplification of only the intermediate frequency signals. The intermediate frequency signals are then introduced to a second detector stage 160.

The signals from the detector 160 pass to a frequency discriminator 162 which converts the frequency modulated audio signals into corresponding amplitude modulations. The amplitude modulated signals are amplified by a stage 164 and the output signals from the amplifier are introduced to a loud speaker 166. The intensity of the sound from the loud speaker 166 is controlled by the potential on the movable arm of the potentiometer 126 in FIGURE 3, as is indicated by the disposition of the potentiometer 126 within the box representing the amplifier 164. The intensity of the sound from the loud speaker 166 may be varied by manual adjustments of the knob 138 or by actuating the apparatus shown in FIGURE 1 to produce beat signals having a suitable frequency such as 1.25 kilocycles per second or 2.0 kilocycles per second.

The signals from the detector 160 are also amplified by a stage 170 which is tuned to the video frequency. The amplified video signals are then introduced to a picture tube 173. The signals from the detector 160 also pass to a sync separator stage 172 which operates to clip the signals so that only the signals above a particular amplitude can pass through the stage. This clipping amplitude is chosen so that only the signal providing a reference in each complete scan of a picture frame is able to pass through the stage 172. The sync signal passing through the stage 172 triggers the horizontal sweep circuit 174 and the vertical sweep circuit 176 to initiate the production by the sweep circuits of signals having saw-tooth waveforms. The signals produced by the sweep circuits 174 and 176 are introduced to the picture tube 173 to provide a scan of the complete face of the tube in each picture frame.

A source 176 of direct voltage is also included to supply power to the different stages shown in FIGURES 3 and 5. The switch 124 is connected between the voltage source 176 and the different stages to control the introduction of energizing voltage to the different stages. As previously described, the switch 124 becomes opened by the cam 120 upon full rotation in one direction and becomes closed when the cam initially rotates in the opposite direction. In this way, the energizing of the television receiver is controlled by the actuation of the switch 124.

It will be seen from the above discussion that the apparatus constituting this invention provides controls from a remote position as to the intensity of sound emanating from a television receiver. The controls are such that the intensity of the sound can be adjusted progressively to any desired value. The controls are also advantageous since they operate to turn the television set on or off.

In this way, two controls are provided to perform a function previously obtained from four controls and to perform the functions in a way more advantageous than that previously obtained from the four controls since a progressive adjustment in the intensity of the sound is produced. The apparatus constituting this invention is also advantageous in that it prevents the station being viewed from being changed on a remote basis during the time that the intensity of sound from the television receiver is being adjusted on a remote basis.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use with a television receiver having a variably positioned control member to control the energizing of the television receiver for the reception of television signals and to control the intensity of sound in the receiver, means disposable at a position away from the receiver for transmitting first and second signals having different characteristics from each other and for particular durations of time, means including first and second energizing members at the receiver and responsive to the first and second signals for energizing the first member upon the reception of the first signals and for energizing the first and second members upon the reception of the second signals, means including a motor coupled to the control member and responsive to the energizing of the first and second energizing members for obtaining an operation of the motor to progressively drive the control member in one direction upon an energizing of only the first member and for obtaining an operation of the motor to progressively drive the control member in the opposite direction upon an energizing of the first and second members, and means operatively coupled to the control member for providing a manual operation of the control member to any desired position.

2. In combination for use with a television receiver for driving a variably positioned control member to control the energizing of the receiver for the reception of television signals and to control the intensity of sound in the receiver and having a remotely controlled channel selector, actuatable means disposed in removed relationship to the receiver for providing first signals upon actuation initially to turn on the receiver and subsequently to progressively increase the intensity of sound in the receiver and for providing second signals upon actuation initially to progressively decrease the intensity of sound in the receiver and subsequently to turn off the receiver, means operatively coupled to the actuating means and responsive to the first and second signals for transmitting such signals, means disposed at the receiver to receive the transmitted signals and to detect the first and second signals, means including a motor operatively coupled to the last mentioned means and responsive to the detected signals and coupled to the control member for driving the member in a direction dependent upon the occurrence of the first or second signals and for a period of time corresponding to the duration of the first or second signals, means operatively coupled to the control member for obtaining a manual operation of the control member to any desired position including on, off and any desired intensity of sound, and means operatively coupled to the receiving means for preventing the channel selector from being remotely controlled during the reception of the first or second signals.

3. In combination for use with a television receiver having a variably positioned control member to control the energizing of the television receiver for the reception of television signals and to control the intensity of sound in the receiver and having a remotely controlled channel selector, means disposable at a position removed from the receiver and including means actuatable to first and second positions to obtain the production of first signals initially representing the energizing of the television receiver and subsequently representing a progressive increase in the intensity of sound from the receiver and to obtain the production of second signals initially representing a progressive decrease in the intensity of sound from the receiver and subsequently representing the deenergizing of the receiver, receiving means disposed at the television receiver to receive the transmitted signals and to detect such signals for the production of the first and second signals, a motor coupled to the variably positioned control member to drive the member, means including the motor operatively coupled to the receiving means and responsive to the detected first and second signals to obtain an energizing of the motor for operation to drive the control member in a first direction upon the detection of the first signals and to obtain an energizing of the motor for operation to drive the control member in an opposite direction upon the detection of the second signals, and means coupled to the last mentioned means for preventing the channel selector from being remotely controlled during the detection of the first and second signals at the receiver.

4. In combination for use with a television receiver having a variably positioned control member to control the energizing of the television receiver for the reception of television signals and to control the intensity of sound in the receiver and having a station selector to control the station being viewed at each instant, means including actuatable means at a position removed from the receiver for initially obtaining the production of first signals controlling the energizing of the receiver and subsequently controlling an increase in the intensity of sound in the receiver and for obtaining the production of second signals initially controlling the decrease in the intensity of sound in the receiver and subsequently controlling the de-energizing of the receiver and for obtaining the production of third signals controlling the operation of the channel selector, means at the receiver for receiving the transmitted signals, detecting means coupled to the last mentioned means for detecting the received signals to produce the first, second and third signals, a motor operative in first and second opposite directions and coupled to the control member to drive the member in these directions, means including first and second relay means connected in electrical circuitry with the detecting means and the motor and responsive to the detected signals for obtaining an operation of the first relay means upon the detection of the first signals to obtain an operation of the motor in one direction and for obtaining an operation of the first and second relay means upon the detection of the second signals to obtain an operation of the motor in the opposite direction, switching means coupled to the control member to control the energizing of the television receiver in accordance with the positioning of the control member, means coupled to the detecting means for obtaining an operation of the channel selector upon the detection of the third signals, and means operatively coupled to the detecting means and the last mentioned means for preventing the channel selector from operating during the detection of the first or second signals.

5. In combination for use with a television receiver having a variably positioned control member to control the energizing of the television receiver for the reception of television signals and to control the intensity of sound in the receiver, means including actuatable means at a position removed from the receiver for obtaining the production of first signals initially controlling the energizing of the receiver and subsequently controlling the increase in the intensity of sound in the receiver and for obtaining the production of second signals initially controlling the decrease in the intensity of sound in the receiver and subsequently controlling the de-energizing of the receiver, means coupled to the last mentioned means for obtaining a transmission of the first and second signals, means at the television receiver for receiving the transmitted signals, means coupled to the receiving means for detecting the first and second signals, motor means coupled to the control member for progressively driving the control member during the energizing of the motor, means including first relay means responsive to the first signals for obtaining an energizing of the motor means in one direction upon the detection of the first signals and during such detection and including the first relay means and second relay means for obtaining an energizing of the motor in the opposite direction upon the detection of the second signals and during such detection, switching means included in the television receiver and operative in a first direction to obtain an energizing of the receiver and operative in a second direction to obtain a de-energizing of the receiver, means coupled to the variably positioned control member for operating upon the switching means to obtain an operation of the switching means in the first position upon an initial operation of the motor means in the first direction and for obtaining an operation of the switching means in the second direction upon a sustained operation of the motor means in the second direction, and means operatively coupled to the control member for providing a manual operation of the control member between the first and second positions and for providing a slippage between such means and the control member upon any attempt to manually actuate the control member beyond the first and second positions.

6. In combination for use with a television receiver having a variably positioned control member to control the energizing of the television receiver for the reception of television signals and to control the intensity of sound in the receiver, means disposable at a position removed from the receiver and including means actuatable to first and second positions to obtain the production of first signals initially representing the energizing of the television receiver and subsequently representing a progressive increase in the sound from the receiver and to obtain the production of second signals initially representing a progressive decrease in the intensity of sound from the receiver and subsequently representing the de-energizing of the receiver, means coupled to the last mentioned means for transmitting the first and second signals, means at the receiver for receiving the transmitted signals and for detecting the signals to produce the first and second signals, first and second relays at the receiver, a motor at the receiver, first and second switching means operatively coupled to the first and second relays for actuation upon an energizing of their associated relays, electrical circuitry including the motor and including the first switching means for energizing the motor to rotate in a first direction upon the actuation of the first switching means and including the motor and the first and second switching means for energizing the motor to rotate in an opposite direction upon the actuation of the first and second switching means, and means responsive to the first signals for obtaining an energizing of the first relay and responsive to the second signals for obtaining an energizing of the first and second relays.

7. In combination for use with a receiver to progressively control performance characteristics of the receiver, actuatable means disposed in removed relationship to the receiver for providing first signals upon actuation to vary the particular performance characteristics of the receiver in a first direction and for providing second signals upon actuation to vary the particular performance characteristics of the receiver in a second direction opposite to the first direction, means operatively coupled to the actuatable means and responsive to the first and second signals for obtaining a transmission of the signals to the receiver, receiving means at the receiver for receiving the first and second signals and for detecting these signals, impedance means variable between first and second limit positions to progressively control the performance characteristics of the receiver, motive means operatively coupled to the impedance means for obtaining progressive variations of the impedance means between the first and second limit positions in accordance with the energizing of the motor, electrical circuitry operatively coupled to the receiving means and responsive to the first and second detected signals for obtaining an energizing of the motive means in accordance with the detection of the first and second signals and during such detection, and means including a knob operatively coupled to the impedance means for obtaining a manual variation of the impedance means.

8. The combination set forth in claim 7 in which the operative coupling between the motive means and the impedance means causes a slippage of the impedance means relative to the motive means to occur when the impedance means has been varied to one of the limit positions.

9. In combination for use with a receiver progressively to control particular performance characteristics of the receiver and wherein the receiver has a station selector to control the station being viewed at each instant, actuatable means disposed in removed relationship to the receiver for providing first signals upon actuation to vary the particular performance characteristics of the receiver in a first direction and for providing second signals upon actuation to vary the particular performance characteristics of the receiver in a second direction opposite to the first direction and to provide third signals upon actuation for operating the station selector to vary the station being viewed at each instant, means operatively coupled to the actuatable means and responsive to the first and second and third signals for transmitting such signals to the receiver, receiving means at the receiver for receiving the transmitted first and second and third signals, impedance means included in the receiver and progressively variable in first and second opposite directions to produce corresponding variations in the particular performance characteristics of the receiver, motive means operatively coupled to the impedance means and constructed to be energized in first and second opposite directions to obtain corresponding variations of the impedance means in the first and second opposite directions, switching means, electrical circuitry including the switching means and the motor and operatively coupled to the receiving means and responsive to the first and second received signals for obtaining an energizing of the motor during the reception of the first and second signals and for obtaining an energizing of the motor in a direction progressively to vary the impedance means in accordance with the respective reception of the first and second signals, means operatively coupled to the receiving means and responsive to the third signals for obtaining an actuation of the station selector, and means operatively coupled to the receiving means and the last mentioned means for preventing the operation of the station selector by the third signal upon the reception of the first and second signals.

10. The combination set forth in claim 9 in which a knob is operatively coupled to the impedance means at an external position on the receiver to obtain a manual variation of the impedance means in the first and second opposite directions.

11. In combination for use with a receiver to progressively control particular performance characteristics of the receiver, actuatable means disposed in removed relationship to the receiver for providing first signals upon actuation to vary the particular performance characteristics of the receiver in a first direction and for providing second signals upon actuation to vary the particular performance characteristics of the receiver in a second direction opposite to the first direction, means operatively coupled to the actuatable means and responsive to the first and second signals for obtaining a transmission of such signals to the receiver, receiving means at the receiver for receiving and detecting the first and second signals, a drive member at the receiver and respectively movable in first and second opposite directions between first and second limit positions, a knob disposed at an external position on the receiver and disposed on the drive member to obtain a manual movement of the drive member in the first and second opposite directions between the first and second limit positions, a cam disposed on the drive member for movement with the drive member between the first and second limit positions and for slippage on the drive member after such movement between the limit positions; a motor operatively coupled to the receiving and detecting means and responsive to the first and second detected signals respectively to produce movements of the drive member in the first and second opposite directions during the detection of the first and second signals, and impedance means operatively coupled to the cam and responsive to the movement of the cam in the first and second opposite directions between the first and second limit positions to progressively vary the particular performance characteristics of the receiver in accordance with such movements.

12. In combination for use with a receiver for driving a first variably positioned control member to progressively control particular performance characteristics of the receiver and for driving a second variably positioned control member to control second particular characteristics of the receiver, actuatable means disposed in removed relationship to the receiver for providing first signals to obtain a progressive actuation of the first control member and for providing second signals to obtain an actuation of the second control member, means operatively coupled to the actuatable means and responsive to the first and second signals to transmit such signals, receiving means at the receiver for receiving the first and second signals, means at the receiver and operatively coupled to the receiving means and responsive to the reception of the first signals for obtaining a progressive actuation of the first control member during the reception of the first signals, means at the receiver and operatively coupled to the receiving means and responsive to the reception of the second signals for obtaining an actuation of the second control member, and means at the receiver and operatively coupled to the first receiving means and the second control member and responsive to the first signals for preventing the second control member from being actuated during the reception of the first signals at the receiver and in spite of any reception of the second signals at the receiver.

13. In combination for use with a receiver for driving a first variably positioned control member to progressively control first particular performance characteristics of the receiver and for driving a second variably positioned control member to control second particular performance characteristics of the receiver, actuatable means disposed in removed relationship to the receiver for providing first and second signals to obtain a movement of the second control member and for providing third signals to obtain a movement of the first control member in a third direction and for providing fourth signals to obtain a movement of the first control member in a fourth direction opposite to the third direction, means operatively coupled to the actuatable means and responsive to the first, second, third and fourth signals to transmit such signals, receiving means disposed at the receiver to receive the transmitted signals and to detect the first, second, third and fourth signals, means including first electrical circuitry at the receiver and operatively coupled to the receiving means and responsive to the first and second signals to obtain an actuation of the second control member during the detection of the first and second signals, and means including second electrical circuitry at the receiver and operatively coupled to the receiving means and responsive to the third and fourth signals respectively to obtain a progressive actuation of the first control member in the first and second opposite directions, the second electrical circuitry being operatively coupled to the first electrical circuitry to prevent the second control member from being actuated during the time that the first control member is being actuated.

References Cited in the file of this patent

RCA Service Data, 1958, No. T10, July 29, 1958.

"Remote Controls for T.V."; Radio-Electronics, September 1956, pp. 34, 35 and 36.

"Push-Button Remote T.V. Tuning"; Radio and Television News, December 1956, pp. 94 and 95.

"Two New T.V. Remote Controls"; Radio-Electronics, February 1957, pp. 42, 43 and 44.